United States Patent
Takajo et al.

(10) Patent No.: US 9,537,764 B2
(45) Date of Patent: Jan. 3, 2017

(54) COMMUNICATION APPARATUS, CONTROL APPARATUS, COMMUNICATION SYSTEM, COMMUNICATION METHOD, METHOD FOR CONTROLLING COMMUNICATION APPARATUS, AND PROGRAM

(71) Applicants: Mamoru Takajo, Tokyo (JP); Masanori Takashima, Tokyo (JP); Shihomi Sato, Tokyo (JP)

(72) Inventors: Mamoru Takajo, Tokyo (JP); Masanori Takashima, Tokyo (JP); Shihomi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 103 days.

(21) Appl. No.: 14/385,453

(22) PCT Filed: Mar. 26, 2013

(86) PCT No.: PCT/JP2013/058756
§ 371 (c)(1),
(2) Date: Sep. 15, 2014

(87) PCT Pub. No.: WO2013/146770
PCT Pub. Date: Oct. 3, 2013

(65) Prior Publication Data
US 2015/0085666 A1   Mar. 26, 2015

(30) Foreign Application Priority Data
Mar. 28, 2012 (JP) .................................. 2012-074655

(51) Int. Cl.
*H04L 1/00* (2006.01)
*H04L 12/721* (2013.01)
(Continued)

(52) U.S. Cl.
CPC ............... *H04L 45/38* (2013.01); *H04L 12/18* (2013.01); *H04L 41/0803* (2013.01);
(Continued)

(58) Field of Classification Search
USPC  370/236, 235, 389, 392, 252, 354; 709/203; 710/19
See application file for complete search history.

(56) References Cited

U.S. PATENT DOCUMENTS

2003/0026256 A1 *  2/2003  Jinzaki ................ H04L 12/1881
                                                          370/392
2004/0223486 A1    11/2004  Pachl
(Continued)

FOREIGN PATENT DOCUMENTS

JP   2002-171284     6/2002
RU   2 435 321 C2    7/2010
(Continued)

OTHER PUBLICATIONS

Korean Office Action dated Aug. 18, 2015 with an English translation.
(Continued)

*Primary Examiner* — Chi H Pham
*Assistant Examiner* — Alexander O Boakye
(74) *Attorney, Agent, or Firm* — Finnegan, Henderson, Farabow, Garrett & Dunner LLP

(57) ABSTRACT

A communication apparatus is provided with: a processing rule storage unit capable of storing a first processing rule for unknown packets set in advance, and a second processing rule set by a control apparatus; a packet processor that processes received packets based on processing rules stored in the processing rule storage unit; and a state notification unit that transmits a predetermined control message to the control apparatus when a packet is processed using the first
(Continued)

processing rule. On receiving the predetermined control message, the control apparatus creates the second processing rule to be set in the communication apparatus and sets the second processing rule in the communication apparatus, and also discards packets included in the control message. The communication apparatus continues packet processing using the first processing rule until the second processing rule is set by the control apparatus.

23 Claims, 9 Drawing Sheets

(51) Int. Cl.
*H04L 29/06* (2006.01)
*H04L 12/18* (2006.01)
*H04L 12/803* (2013.01)
*H04L 12/24* (2006.01)
*H04L 12/715* (2013.01)

(52) U.S. Cl.
CPC ............ *H04L 47/125* (2013.01); *H04L 69/12* (2013.01); *H04L 45/64* (2013.01); *H04L 69/22* (2013.01)

(56) References Cited

U.S. PATENT DOCUMENTS

| | | | |
|---|---|---|---|
| 2006/0136987 A1* | 6/2006 | Okuda | ................... H04L 29/06 726/1 |
| 2006/0230077 A1* | 10/2006 | Satou | ................... G06F 9/5027 |
| 2010/0054246 A1 | 3/2010 | Shah et al. | |
| 2010/0103837 A1 | 4/2010 | Jungck et al. | |
| 2010/0284378 A1 | 11/2010 | Cavalli et al. | |

FOREIGN PATENT DOCUMENTS

| | | |
|---|---|---|
| RU | 2 427 091 C2 | 4/2011 |
| WO | WO 2008/104100 A1 | 9/2008 |
| WO | WO 2012/023292 A1 | 2/2012 |

OTHER PUBLICATIONS

Open Networking Foundation, "OpenFlow Switch Specification", Version 1.2 (Wire Protocol 0x03), ONF TS-003, (Dec. 5, 2011).
Decision on Grant mailed Dec. 9, 2015 by the Russian Patent Office in counterpart Russian Patent Application No. 2014143340/08(069944).
International Search Report (ISR) (PCT Form PCT/ISA/210), in PCT/JP2013/058756, dated Jul. 2, 2013.
Nick McKeown and 7 others, "OpenFlow: Enabling Innovation in Campus Networks", [online], [search conducted Feb. 14, 2012], Internet <URL: http://www.openflow.org/documents/openflow-wp-latest.pdf>.
"OpenFlow 1.2", [online], [search conducted Mar. 27, 2012], Internet <URL: https://www.opennetworking.org/images/stories/downloads/openflow/openflow-spec-v1.2.pdf>.
Harrison, "Frenetic: A Network Programming Language," Master's thesis, Princeton University, May 2011, pp. 15-25, [retrieved on Jun. 19, 2013]. Retrieved from the Internet: <URL: http://frenetic-lang.org/publications/harrison-mse/thesis.pdf>.
Rob Sherwood, "Understanding OpenFlow: Packet-In is a Page Fault," Project Floodlight, Feb. 27, 2012, [retrieved on Jun. 19, 2013]. Retrieved from the Internet: <URL: http://www.projectfloodlight.org/blog/2012/02/27/packet-in0is-a-page-fault/>.
Extended European Search Report dated Sep. 29, 2015.

* cited by examiner

FIG. 5

| Priority | RETRIEVAL CONDITION | ACTION | DESCRIPTION |
|---|---|---|---|
| 65535 | Exact | Output=0/cc | HIGH PRIORITY FLOW ENTRY => SECOND PROCESSING RULE |
| ... | ... | ... | ... |
| 60000 | dl_dest=x.x.x.x | Output=0/dd | UNICAST FLOW ENTRY => SECOND PROCESSING RULE |
| ... | ... | ... | ... |
| a | In_port=0/bb | FLOODING PACKET-IN (FORWARDING DONE) | UNKNOWN UNICAST FLOW ENTRY => FIRST PROCESSING RULE |

COMMUNICATION APPARATUS, CONTROL APPARATUS, COMMUNICATION SYSTEM, COMMUNICATION METHOD, METHOD FOR CONTROLLING COMMUNICATION APPARATUS, AND PROGRAM

TECHNICAL FIELD

Reference to Related Application

The present application claims priority from Japanese Patent Application No. 2012-074655 (filed on Mar. 28, 2012), the content of which is hereby incorporated in its entirety by reference into this disclosure. The present invention relates to a communication apparatus, a control apparatus, a communication system, a communication method, a method for controlling the communication apparatus, and a program, and in particular relates to a communication apparatus, a control apparatus, a communication system, a method for controlling the communication apparatus, and a program, that perform packet processing in accordance with control information set by the control apparatus.

BACKGROUND

With the expansion of network bandwidth, services are required that handle large amounts of data such as image distribution and the like. As a component technology thereof, OpenFlow in Non Patent Literature 1 and 2 may be cited. In OpenFlow, switches capable of high-speed forwarding are arranged on a user plane, and by optimally setting path information by an OpenFlow controller, it is possible to adequately respond to high speed forwarding needs.

[Non Patent Literature 1]
Nick McKeown and 7 others, "OpenFlow: Enabling Innovation in Campus Networks", [online], [search conducted Feb. 14, 2012], Internet <URL: http://www.openflow.org/documents/openflow-wp-latest.pdf>

[Non Patent Literature 2]
"OpenFlow 1.2", [online], [search conducted Mar. 27, 2012], Internet <URL: https://www.opennetworking.org/images/stories/downloads/openflow/openflow-spec-v1.2.pdf>

SUMMARY

The following analysis is given by the present invention. In a centrally controlled network as represented by OpenFlow in Non Patent Literature 1 and 2, there is a problem in that, until setting of a processing rule (equivalent to a flow entry in OpenFlow) by a control apparatus is completed, it is necessary to perform forwarding (Packet-in, Packet-out messaging in OpenFlow protocol) via a control plane. In this way, in a case of a data burst or a large amount of data being inputted, there are problems of load increase in an entire system including a control apparatus and communication apparatus on an input side, and of packet loss occurrence.

As a result of forwarding via a control plane, before and after setting control information by the control apparatus, there is also a problem of order being reversed with regard to packets for which the control apparatus has specified forwarding via the control plane, and packets for which sequential forwarding is started by a newly set processing rule. For example, in FIG. 9, a forwarding instruction (Packet-out; S207) is received via the control plane from a controller, but before that, a Unicast (S206) of a following packet is performed first by a unicast flow entry set in steps S204, S205 (Flow-mod).

It is an object of the present invention to provide a communication apparatus, a control apparatus, a communication system, a communication method, a method for controlling the communication apparatus, and a program, that contribute to reducing load when a relatively large amount of data is inputted, in the abovementioned centrally controlled network, and to inhibiting reversal of order of arrival of the packets described above.

According to a first aspect, there is provided a communication apparatus that includes: a processing rule storage unit capable of storing a first processing rule for unknown packets set in advance, and a second processing rule set by a control apparatus; a packet processor that processes received packets based on processing rules stored in the processing rule storage unit; and a state notification unit that transmits a predetermined message to the control apparatus when a packet is processed using the first processing rule; wherein the communication apparatus continues packet processing using the first processing rule until the second processing rule is set by the control apparatus.

According to a second aspect, there is provided a control apparatus connected to the abovementioned communication apparatus, wherein the control apparatus creates, on receiving the predetermined control message, the second processing rule to be set in the communication apparatus and sets the second processing rule in the communication apparatus, and also discards packets included in the control message.

According to a third aspect, there is provided a communication system including the abovementioned communication apparatus and the control apparatus.

According to a fourth aspect, there is provided a communication method wherein a communication apparatus including a processing rule storage unit capable of storing a first processing rule for unknown packets set in advance, and a second processing rule set by a control apparatus, and a packet processor that processes received packets based on processing rules stored in the processing rule storage unit, performs: transmitting a predetermined control message to the control apparatus when a packet is processed using the first processing rule, and continuing packet processing using the first processing rule until the second processing rule is set by the control apparatus. The present method is linked to a specific apparatus known as a communication apparatus that processes packets using processing rules from the control apparatus.

According to a fifth aspect, there is provided a control method wherein a control apparatus connected to a communication apparatus that includes a processing rule storage unit capable of storing a first processing rule for unknown packets set in advance and a second processing rule set by the control apparatus, a packet processor that processes received packets based on processing rules stored in the processing rule storage unit, and a state notification unit that transmits a predetermined control message to the control apparatus when a packet is processed using the first processing rule, performs: a step of creating, on receiving the predetermined control message from the communication apparatus, the second processing rule to be set in the communication apparatus, and setting the second processing rule in the communication apparatus, and a step of discarding packets included in the control message. The present method is linked to a specific apparatus known as control apparatus that sets processing rules in response to a request from the communication apparatus.

According to a sixth aspect, there is provided a computer program that is executed in each of the communication apparatus and the control apparatus as described above. It is to be noted that the program may be recorded on a computer readable (non-transitory) recording medium. That is, the present invention may be embodied as a computer program product.

The meritorious effects of the present disclosure are summarized as follows.

According to the present disclosure, in a centrally controlled network it is possible to contribute to reducing load in respective apparatuses when a large amount of data is inputted, and to inhibiting reversal of the order of packet transmission.

BRIEF DESCRIPTION OF DRAWINGS

FIG. 5 is an example of a flow table held in a communication apparatus of the first exemplary embodiment of the disclosure.

PREFERRED MODES

Figure 1:
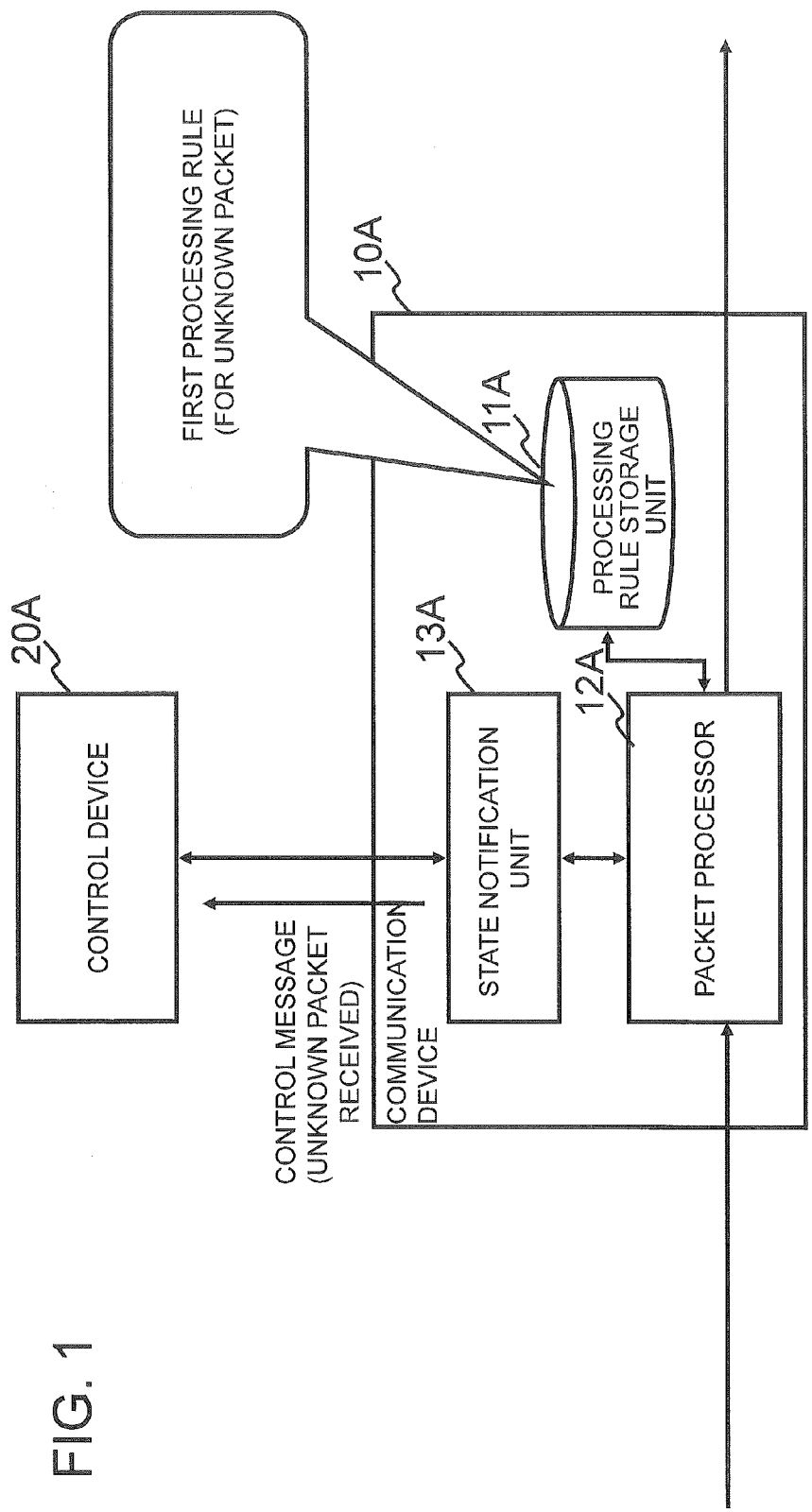
FIG. 1 is a diagram showing a configuration of an exemplary embodiment of the present disclosure.

First, a description is given of an outline of an exemplary embodiment of the present disclosure, making reference to the drawings. It is to be noted that reference symbols in the drawings attached to this outline are added for convenience to respective elements as examples in order to aid understanding, and are not intended to limit the disclosure to modes shown in the drawings.

In the exemplary embodiment, as shown in FIG. 1, the present disclosure may be realized by a configuration including at least one communication apparatus 10A and a control apparatus 20A that controls the communication apparatus 10A. More specifically, the communication apparatus 10A is provided with: a processing rule storage unit 11A capable of storing a first processing rule for unknown packets set in advance, and a second processing rule set by a control apparatus; a packet processor 12A that processes received packets based on processing rules stored in the processing rule storage unit; and a state notification unit 13A that transmits a predetermined message to the control apparatus 20A when a packet is processed using the first processing rule. The communication apparatus 10A continues packet processing using the first processing rule until the second processing rule is set by the control apparatus 20A.

Meanwhile, on receiving the predetermined control message from the communication apparatus 10A, the control apparatus 20A creates the second processing rule to be set in the communication apparatus 10A and sets the second processing rule in the communication apparatus 10A. It is to be noted that the control apparatus 20A discards packets included in the control message without a packet transmission instruction being performed with regard to the communication apparatus 10A as performed in Non Patent Literature 1 and 2 (namely, a packet forwarding operation via a control plane is not performed).

Figure 2:
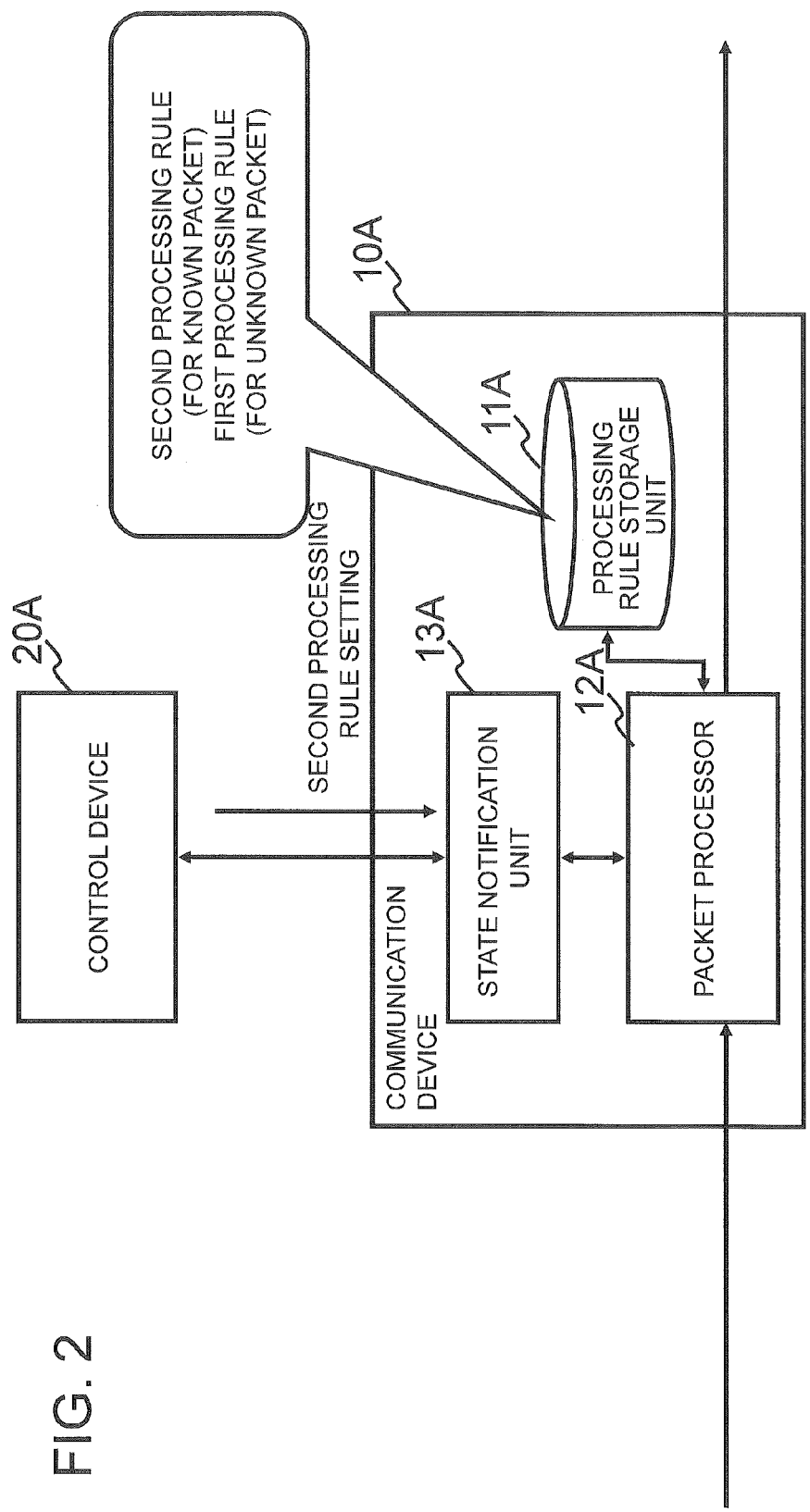
FIG. 2 is a diagram for describing operations of the exemplary embodiment of the disclosure.

By the above configuration, even if a large amount of data is inputted, since processing is performed by the first processing rule, the control apparatus 20A is not overloaded. As shown in FIG. 2, after the second processing rule has been set by the control apparatus 20A, as a known packet, switching to processing by the second processing rule is performed, so that packet transmission order is not reversed.

First Exemplary Embodiment

Figure 3:
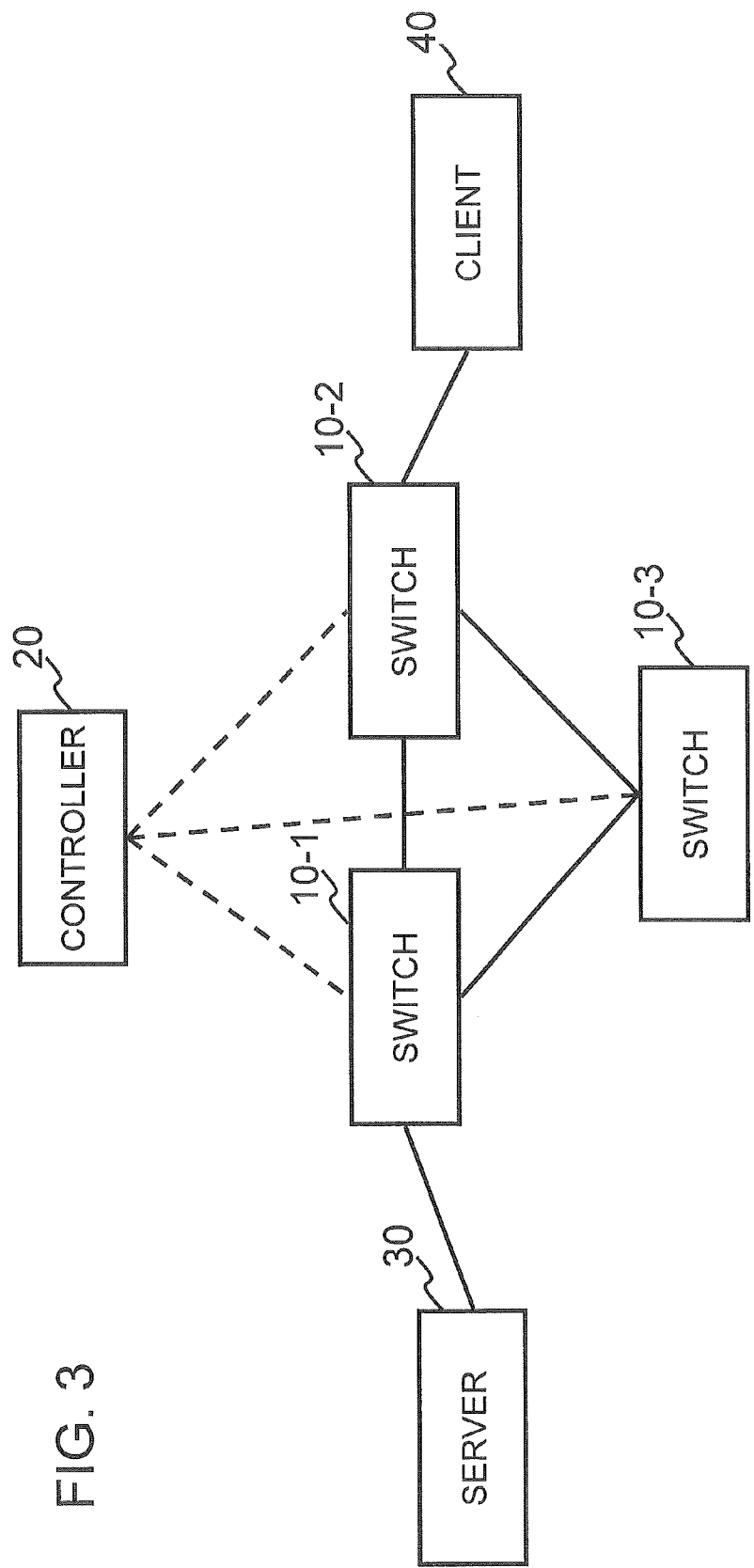
FIG. 3 is a diagram showing a configuration of a communication system according to a first exemplary embodiment of the present disclosure.

Next, a detailed description is given concerning a first exemplary embodiment of the present disclosure, making reference to the drawings. FIG. 3 is a diagram showing a configuration of a communication system according to the first exemplary embodiment of the present disclosure. FIG. 3 shows the communication system that including switches 10-1 to 10-3 connected to one another, and a controller 20 that controls the switches 10-1 to 10-3. A server 30 and a client 40 in FIG. 3 can communicate via the switches 10-1 and 10-3, respectively. It is to be noted that solid lines in FIG. 3 indicate network connection relationships, and broken lines represent channels for control between the controller 20 and the switches.

Figure 4:
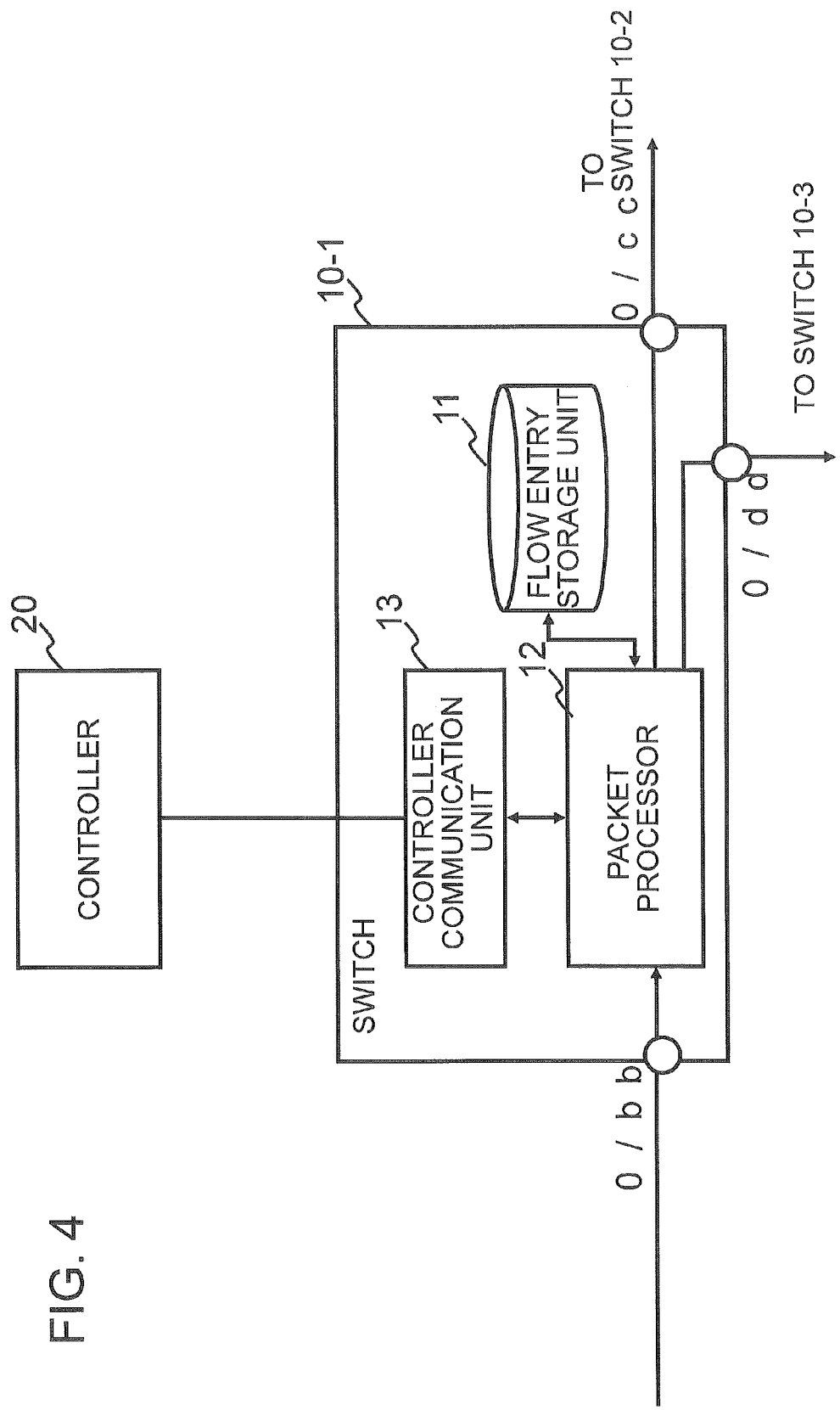
FIG. 4 is a diagram showing a configuration of a switch of the first exemplary embodiment of the disclosure.

FIG. 4 is a diagram showing a configuration of the switch 10-1 of the first exemplary embodiment of the present disclosure. FIG. 4 shows the controller 20 that controls the switch 10-1 by setting flow entries in the switch 10-1, and the switch 10-1 that retrieves a flow entry having a match field that matches a received packet, from among flow entries set by the controller 20, to perform packet processing.

The switch 10-1 is provided with a flow entry storage unit 11 (equivalent to a processing rule storage unit 11A described above) that stores flow entries, a packet processor 12 (equivalent to a packet processor 12A described above) that processes received packets in accordance with a flow entry stored in the flow entry storage unit 11, and a controller communication unit 13 (equivalent to a state notification unit 13A described above) that, in a case where a received packet in the packet processing unit 12 matches a flow entry for an Unknown Unicast and forwarding is performed, transmits a control message indicating this to the controller 20.

FIG. 5 is a diagram showing an example of a flow entry storage table (flow table) stored in the flow entry storage unit 11. A Priority field in the diagram indicates the priority of each flow entry. The example of FIG. 5 shows an example in which 3 flow entries, Priority=65535, Priority=60000, and Priority="a" (note that "a"<60000) are registered. Among these, the flow entry with Priority=65535 is the highest priority flow entry.

A retrieval condition field in FIG. 5 stores information of match fields to match received packets. In the flow entry in the diagram where "Exact" is specified, matching is performed according to Exact Matching with a received packet header or the like. For a flow entry where dl_dest=X.X.X.X is specified, a data link layer address of a received packet, that is, where a destination MAC address is X.X.X.X, is matched. In a case of a flow entry where In_port=0/bb is specified, there is a match with a packet inputted from port 0/bb.

An action field in FIG. 5 shows processing content to be applied to a received packet where there is a match with a condition shown in the retrieval condition field. For example, for a packet matching a flow entry with Priority=65535, processing to forward from port 0/cc is performed (that is, forwarding to switch 10-2). For example, for a packet matching a flow entry with Priority=60000, processing to forward from port 0/dd is performed (that is, forwarding to switch 10-3). For example, for a packet matching a flow entry with Priority="a", flooding processing to forward from port 0/cc and port 0/dd (see FLOOD in "4.5 Reserved ports" of Non Patent Literature 2) and transmission of a Packet-in message (forwarding done) giving notification of new packet reception to the controller 20 (that is, forwarding to switches 10-2, 10-3) are performed. The Packet-in message (forwarding done) differs from a Packet-in message described in Non Patent Literature 1 and 2, and is a control message to which is attached an identifier whereby at least the controller 20 gives notification that forwarding of the received packet has been done, namely, that an output instruction for a received packet in a control plane is unnecessary.

In the following description, the flow entry with Priority=65535 and the flow entry with Priority=60000 are flow entries (second processing rule) set by the controller 20. The flow entry with Priority="a" is a flow entry for an Unknown Unicast (a flow entry for an unknown packet) that is set in advance. Therefore, on receiving a packet, the switch 10-1 performs checking of the received packet with flow entries in the priority order of the flow table of FIG. 5, and where there is a match with the flow entry with Priority=65535 or the flow entry with Priority=60000, processing determined in the action field of the respective flow entries is performed. On the other hand, for a packet that matches neither the flow entry with Priority=65535 nor the flow entry with Priority=60000, flooding processing in accordance with a flow entry for an Unknown Unicast (flow entry for an unknown packet) and transmission of a Packet-in (forwarding done) to the controller 20 are performed.

This type of switch 10-1 can be realized by flooding processing when there is a match, with the abovementioned low priority, in an OpenFlow switch of Non Patent Literature 1 or 2, and by setting a flow entry for an Unknown Unicast (flow entry for an unknown packet) that performs transmission of a Packet-in message (forwarding done) to the controller 20. It is to be noted that since the switches 10-2 and 10-3 have a configuration (content (target flow, executed action and the like) of the flow entry storage unit differs as appropriate) similar to the abovementioned switch 10-1, a description is omitted.

With regard to the controller 20 of FIG. 3 and FIG. 4, in the OpenFlow controller of Non Patent Literature 1 and 2, on receiving a Packet-in message (forwarding done) a path calculation or flow entry setting operation is performed, but implementation is possible by adding a function to discard packets included in the Packet-in message (forwarding done), without giving a packet output instruction to a switch (in the following, where a switch is not particularly distinguished, "switch 10" is indicated).

It is to be noted that functions of the switch 10 and the controller 20 shown in FIG. 3 and FIG. 4 may also be realized in a computer installed in these apparatuses, using hardware thereof, by a computer program that executes the respective processing described above.

Next, a detailed description is given concerning operations of the present exemplary embodiment, making reference to the drawings. The following description cites an example in which data is transmitted to the client 40 from the server 30 in FIG. 3. In an initial state, only a flow entry for an Unknown Unicast with Priority="a" (note that a value is set for "a" that is smaller than the Priority of flow entries set by the controller 20) is set in the flow table of FIG. 5.

Figure 6:
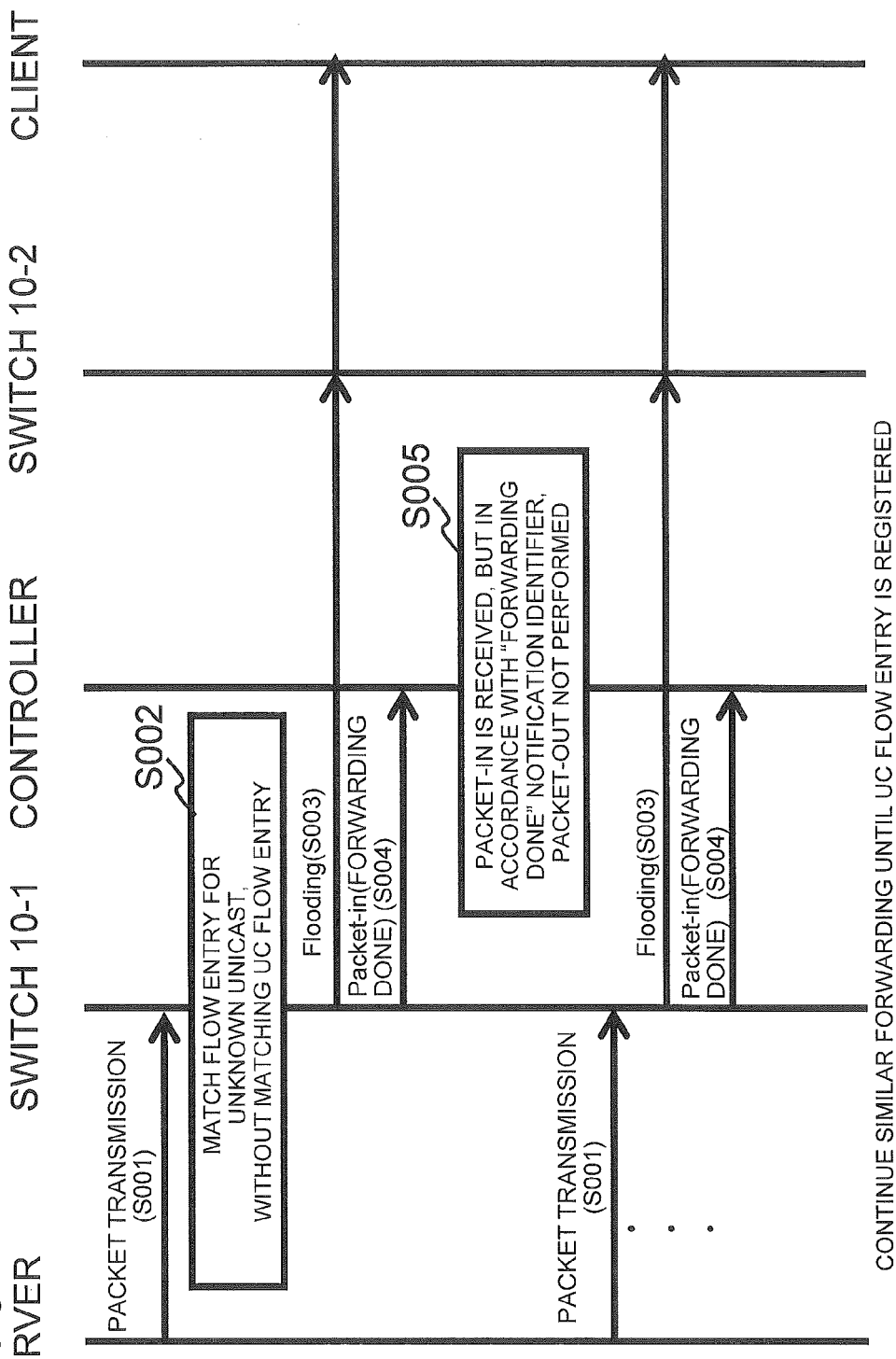
FIG. 6 is a sequence diagram representing operations of the first exemplary embodiment of the disclosure.

FIG. 6 is a sequence diagram representing operations of the first exemplary embodiment of the disclosure. As shown in FIG. 6, first, when an initial packet is transmitted from the server 30 to the client 40 (S001 in FIG. 6), the packet is received at port 0/bb of the switch 10-1.

The switch 10-1 retrieves a flow entry having a match condition (retrieve condition) that matches a packet received from the server 30. At this point in time, since a flow entry with Priority=65535 and a flow entry with Priority=60000 are not set, a match occurs with a flow entry with Priority="a" (S002 in FIG. 6). In this case, the switch 10-1 follows the content of the action field of the flow entry (flow entry for an Unknown Unicast) with Priority="a", to perform flooding processing (S003 in FIG. 6) and Packet-in (forwarding done) transmission (S004 in FIG. 6).

It is to be noted that, while omitted in FIG. 6, processing similar to that of switch 10-2 is performed, and a packet transmitted from the server 30 is forwarded to the client 40 via the switch 10-2.

Meanwhile, the controller 20 that receives the control message Packet-in (forwarding done) recognizes that this is a Packet-in (forwarding done), not a normal Packet-in, and starts path calculation and flow entry creation, but a packet output instruction (Packet-out) using a packet included in the Packet-in (forwarding done) or packet information is not performed (S005 in FIG. 6).

Below, on receiving a packet from the server 30, the switch 10-1 follows the content of the action field of the flow entry (flow entry for an Unknown Unicast) with Priority="a", to perform flooding processing (S003 in FIG. 6) and Packet-in (forwarding done) transmission (S004 in FIG. 6).

Figure 7:
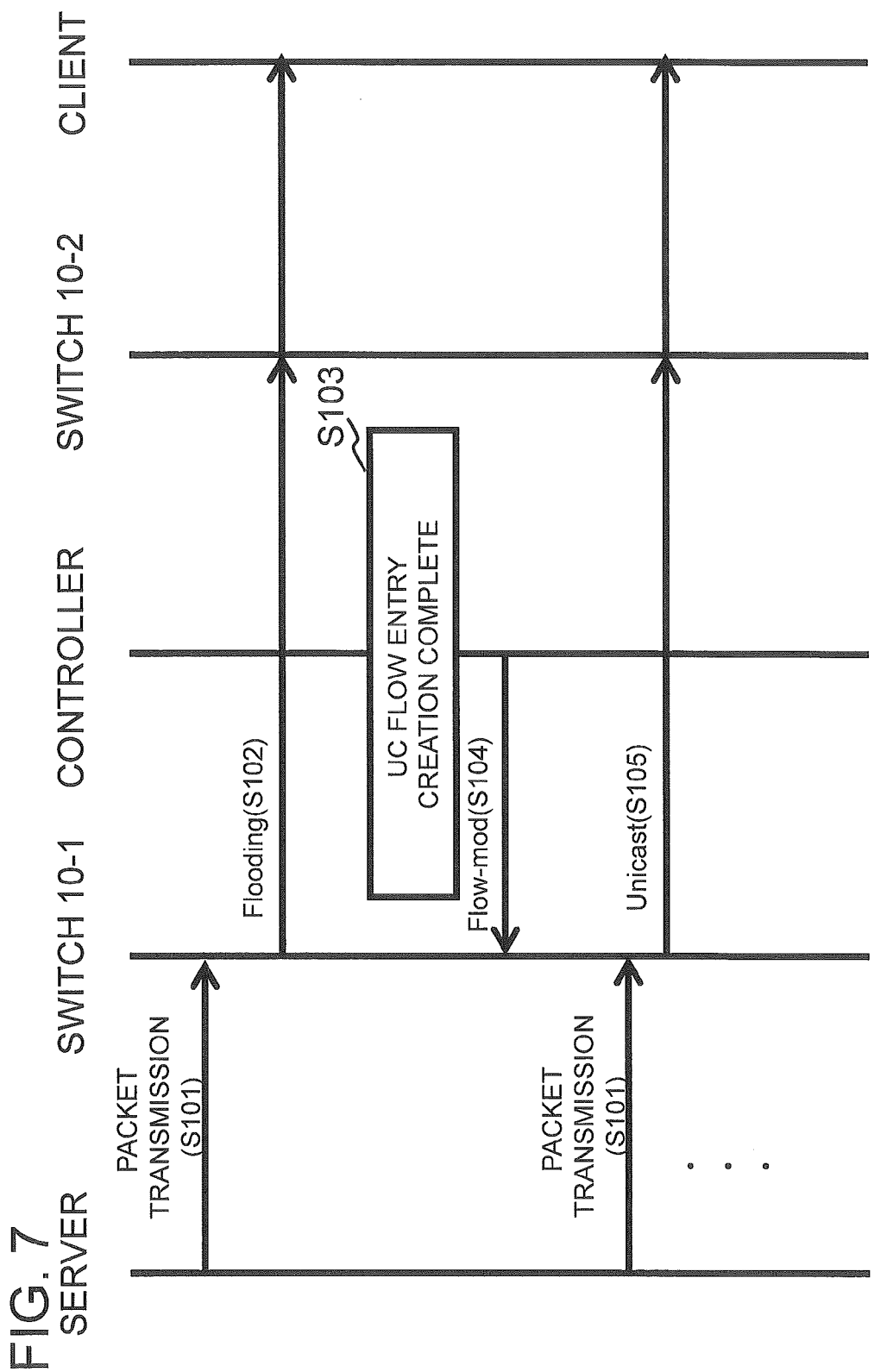
FIG. 7 is continuation diagram of FIG. 6.

Thereafter, as shown in FIG. 7, when the controller 20 creates a Unicast flow entry (UC flow entry) (S103 in FIG. 7), the controller 20 sets the created Unicast flow entry (UC flow entry) for switch 10-1 and switch 10-2 (S104 in FIG. 7; flow-mod).

Setting of the Unicast flow entry (UC flow entry) is completed, and thereafter, on receiving a packet from the server 30, the switches 10-1 and 10-2 perform Unicast forwarding in accordance with the Unicast flow entry (UC flow entry) (S105 in FIG. 7).

As described above, according to the present exemplary embodiment, even if packets exceeding the processing capability of the switch 10 and the controller 20 are generated, packet order reversal and packet loss occurrence are effectively inhibited. A reason for this is that the configuration is such that flooding and Packet-in (forwarding done) transmission to the controller are performed by the flow entry for an Unknown Unicast, a packet transmission instruction is given via the control plane by the controller, and packet output processing accompanying this is inhibited.

Second Exemplary Embodiment

Next, a description is given concerning a second exemplary embodiment of the present disclosure in which a function is added to the switch 10 described above, and Packet-in (forwarding done) transmission itself is inhibited.

Since the present exemplary embodiment is realized by a configuration similar to the first exemplary embodiment described above, the description below is centered on points of difference in operations thereof.

Figure 8:
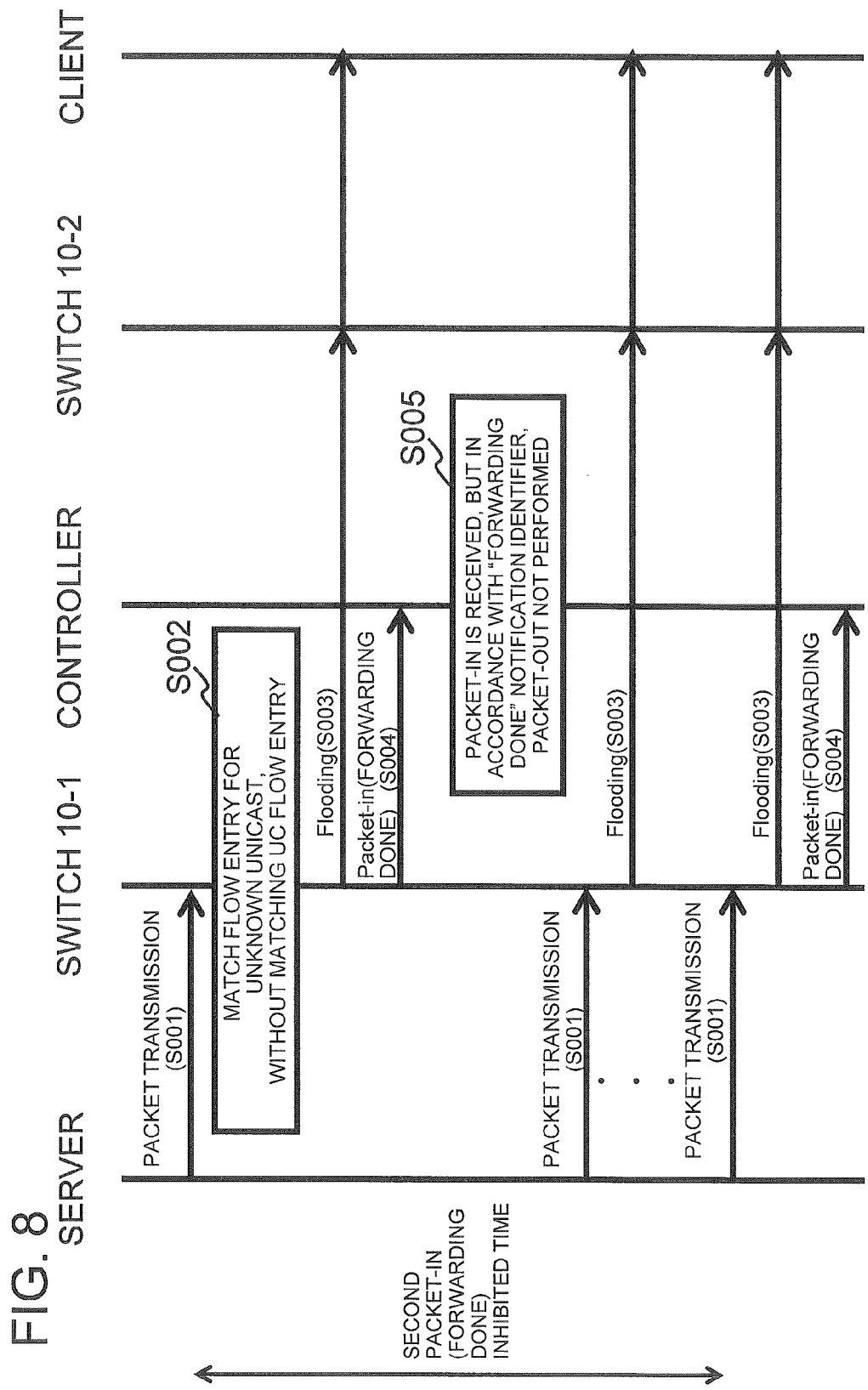
FIG. 8 is a sequence diagram representing operations of a second exemplary embodiment of the disclosure.
Figure 9:
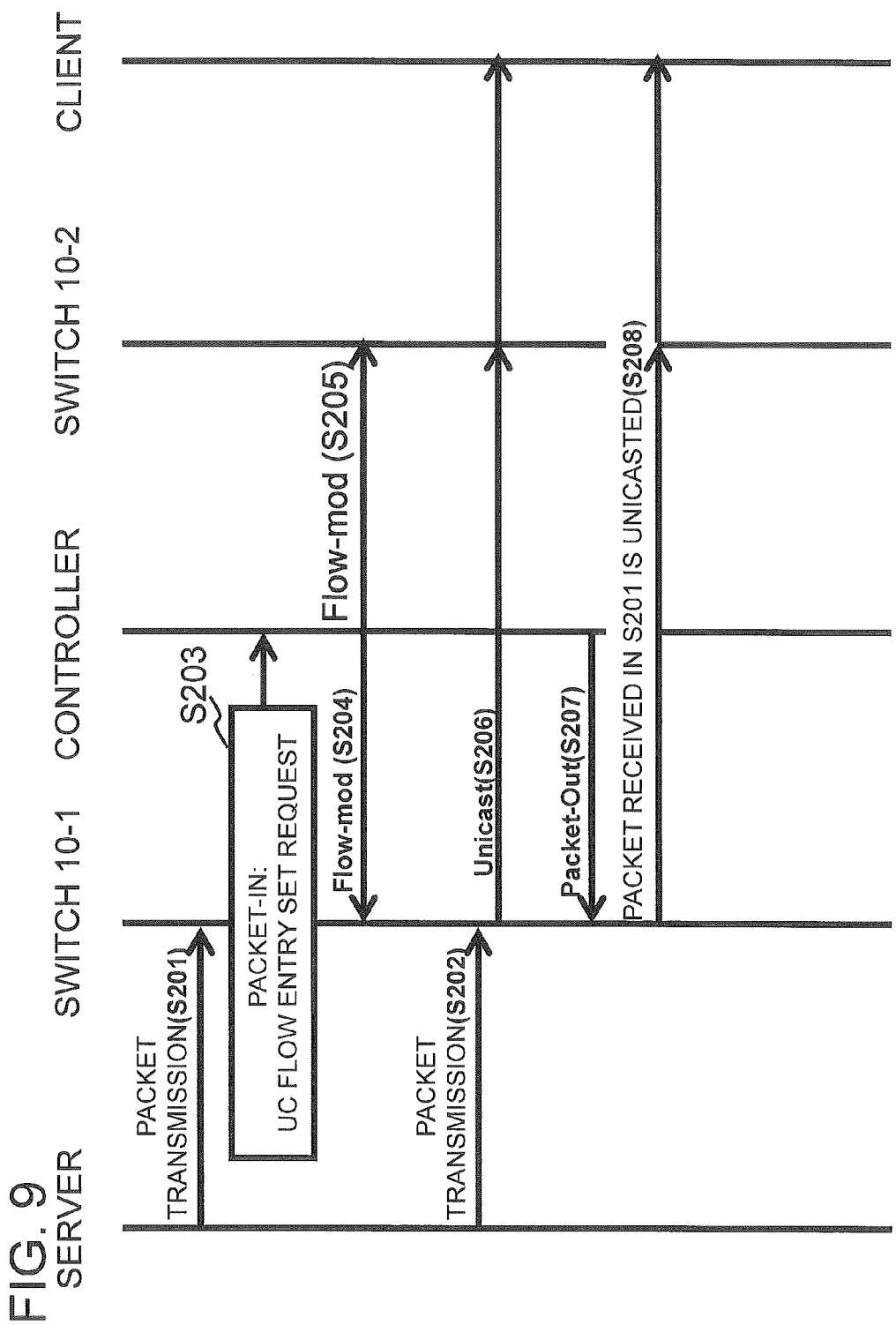
FIG. 9 is a sequence diagram representing operations among switch controllers of Non Patent Literature 1 and 2 showing comparative examples.

FIG. 8 is a sequence diagram representing operations of the second exemplary embodiment of the disclosure. Basic operations of the switch 10 and controller 20 are similar to the first exemplary embodiment, but as shown on the left edge of FIG. 8, after the switch 10 transmits a first control message Packet-in (forwarding done), for a predetermined time, second and subsequent Packet-in (forwarding done) transmissions are inhibited. It is to be noted that the predetermined time can be calculated from system scale, assumed flow type, and the like.

Specifically, when the first packet is received, the switch 10-1 follows the content of the action field of a flow entry (flow entry for an Unknown Unicast) with Priority="a", to perform flooding processing (S003 in FIG. 8) and Packet-in (forwarding done) transmission (S004 in FIG. 8). However, thereafter, until a predetermined time elapses, if a subsequent packet is received, flooding processing (S003 in FIG. 8) is performed but Packet-in (forwarding done) transmission (S004 in FIG. 8) is stopped.

When the predetermined time elapses, the switch 10 performs flooding processing (S003 in FIG. 8) and Packet-in (forwarding done) transmission (S004 in FIG. 8). Thereafter, until the predetermined time elapses, even if data forwarding is performed, the Packet-in (forwarding done) transmission is stopped.

As described above, according to the present exemplary embodiment it is possible to inhibit load increase on the switch 10 and the controller 20 even more than in the first exemplary embodiment. According to the present exemplary embodiment, since adjustment of Packet-in (forwarding done) transmission interval is enabled, it is possible to economize on resources (memory, CPU and the like).

In the abovementioned exemplary embodiment, a description was given where, after transmission of a first control message Packet-in (forwarding done), for a predetermined time, second and subsequent Packet-in (forwarding done) transmissions are inhibited, but instead of a predetermined time, the number of times a target packet for control message Packet-in (forwarding done) is received, or data amount, may be used. In this case, after transmission of the control message Packet-in (forwarding done), the switch 10 inhibits the control message Packet-in (forwarding done), until the number of times a packet is received or the data amount exceed a predetermined threshold. Thereafter when the number of times a packet is received or data amount exceed the predetermined threshold, the switch 10 resets values thereof, and transmits the control message Packet-in (forwarding done). It is to be noted that the number of times a packet is received or the data amount can be implemented by providing a flow statistical information field (Counter), similar to flow entries described in Non Patent Literature 1 and 2.

A description of exemplary embodiments of the present disclosure have been given above, but the disclosure is not limited to the abovementioned exemplary embodiments, and further modifications, substitutions and adjustments may be added within a scope that does not depart from fundamental technical concepts of the disclosure. For example, although the abovementioned exemplary embodiments are not particularly limited, in view of the advantages of the present disclosure as described above, besides utilization in data centers, the disclosure may be preferably applied to sequencing, image distribution service or TV telephony services in which packet loss effects are large.

In the abovementioned exemplary embodiments, a description was given in which flooding processing, is performed, but it is also possible to calculate end-to-end paths where communication is expected to occur giving consideration to network topology, and to set flow entries so as to perform packet forwarding following these paths.

Although omitted in the abovementioned exemplary embodiments, it is also possible to restrict whether or not to allow flooding processing in accordance with security level (authentication state or the like) of a connection destination, or flooding target region (limitation of UDP (User Datagram Protocol) packets and the like). These can be realized by rewriting matching conditions (retrieval conditions) of flow entries for an Unknown Unicast (flow entries for unknown packets), by the controller 20. In this way, it is possible to switch control in accordance with connection destination and state thereof.

In the first exemplary embodiment and the second exemplary embodiment described above, a description was given in which the controller 20 controls the switch 10, but a control target can also be a communication apparatus such as a mobile telephone terminal, a smart phone, a tablet terminal, a personal computer, a game console, a mobile router or the like, that hold flow entries as described above, and in accordance with content thereof, process received packets or packets from an installed application. In this way, for example, it is possible to inhibit load increase due to packets from a packet processor within a apparatus, or packet order reversal.

The first exemplary embodiment and the second exemplary embodiment described above are also preferably operated giving consideration to traffic volume and time slots, which are statistically comprehended, rather than having continuous operation. For example, it is possible to perform control allowing packet forwarding in a control plane as in Non Patent Literature 1 and 2, during nighttime, holidays or the like, when network monitoring level drops, and to perform operations as in the first exemplary embodiment and the second exemplary embodiment, in time slots where large amounts of data communication occur or in states that enable strengthening of monitoring commensurate with large amounts of data communication.

Finally, preferred modes of the present disclosure are summarized.

[Mode 1]
(Refer to the communication apparatus according to the first aspect.)

[Mode 2]
The communication apparatus according to Mode 1, wherein the predetermined message is a control message that requests setting of a second processing rule for packet(s) processed using the first processing rule, with respect to the control apparatus.

[Mode 3]
The communication apparatus according to Mode 1 or Mode 2, wherein the state notification unit transmits, in a case of receiving a packet that matches neither the first nor the second processing rule, a second control message requesting setting of the second processing rule and an instruction to forward the packet, with respect to the control apparatus.

[Mode 4]
The communication apparatus according to any one of Modes 1 to 3, wherein the state notification unit inhibits, after transmission of the predetermined message, transmission of the predetermined control message to the control apparatus, even if a packet is processed using the first processing rule, until a predetermined condition is established.

[Mode 5]

The communication apparatus according to Mode 4, wherein the predetermined condition is any of: elapse of a predetermined time, receipt of more than a predetermined number of packets, and receipt of a data amount greater than a predetermined amount.

[Mode 6]

The communication apparatus according to any one of Modes 1 to 5, wherein the first processing rule is a processing rule for performing a broadcast or a multicast, by predetermined path(s).

[Mode 7]

(Refer to the control apparatus according to the second aspect.)

[Mode 8]

(Refer to the communication system according to the third aspect.)

[Mode 9]

(Refer to the communication method according to the fourth aspect.)

[Mode 10]

(Refer to the control method of the communication apparatus according to the fifth aspect.)

[Mode 11]

A program that executes on a computer installed in a communication apparatus provided with a processing rule storage unit capable of storing a first processing rule for unknown packets set in advance, and a second processing rule set by a control apparatus, and a packet processor that processes received packets based on processing rules stored in the processing rule storage unit, the program including a process of transmitting a predetermined control message to the control apparatus when a packet is processed using the first processing rule, and a process of continuing packet processing using the first processing rule until the second processing rule is set by the control apparatus.

[Mode 12]

A program that executes on a computer installed in a control apparatus connected to a communication apparatus provided with a processing rule storage unit capable of storing a first processing rule for unknown packets set in advance, and a second processing rule set by a control apparatus, a packet processor that processes received packets based on processing rules stored in the processing rule storage unit, and a state notification unit that transmits a predetermined control message to the control apparatus when a packet is processed using the first processing rule, a process of creating, on receiving the predetermined control message from the communication apparatus, the second processing rule to be set in the communication apparatus, and setting the second processing rule in the communication apparatus, and a process of discarding packets included in the control message.

It is to be noted that that the abovementioned Modes 7 to 12 may be extended to Modes 2 to 6, similar to Mode 1.

It is to be noted that the various disclosures of the abovementioned Non Patent Literature are incorporated herein by reference thereto. Modifications and adjustments of exemplary embodiments and examples may be made within the bounds of the entire disclosure (including the scope of the claims) of the present invention, and also based on fundamental technological concepts thereof. Furthermore, various combinations and selections of various disclosed elements (including respective elements of the respective claims, respective elements of the respective exemplary embodiments and examples, respective elements of the respective drawings, and the like) are possible within the scope of the claims of the present invention. That is, the present invention clearly includes every type of transformation and modification that a person skilled in the art can realize according to the entire disclosure including the scope of the claims and to technological concepts thereof.

REFERENCE SIGNS LIST

10-1 to 10-3 switch
10A communication apparatus
11 flow entry storage unit
11A processing rule storage unit
12, 12A packet processor
13 controller communication unit
13A state notification unit
20 controller
20A control apparatus
30 server
40 client

What is claimed is:

1. A communication apparatus comprising:
   a memory configured to store a first processing rule for unknown packets set in advance, and a second processing rule set by a control apparatus; and
   a processor configured to execute program instructions to:
     process a packet based on the first processing rule;
     transmit a first control message to the control apparatus;
     when the second processing rule is set by the control apparatus, process the packet based on the second processing rule; and
     when the packet matches neither the first nor the second processing rule, transmit to the control apparatus a second control message requesting setting of a third processing rule and an instruction to forward the packet.

2. The communication apparatus according to claim 1, wherein the first control message is configured to
   request the control apparatus to set a processing rule for one or more packets processed using the first processing rule.

3. The communication apparatus according to claim 1, wherein the processor is further configured to execute the program instructions to
   inhibit, after transmission of the first control message, transmission of the first control message to the control apparatus, even if the packet is processed using the first processing rule, until a predetermined condition is established.

4. The communication apparatus according to claim 3, wherein the predetermined condition comprises at least one of:
   elapse of a predetermined time, receipt of more than a predetermined number of packets, and receipt of a data amount greater than a predetermined amount.

5. The communication apparatus according to claim 1, wherein the first processing rule comprises
   a processing rule for performing a broadcast or a multicast, by one or more predetermined paths.

6. A control apparatus, connected to a communication apparatus that includes:

a memory configured to store a first processing rule for unknown packets set in advance, and a second processing rule set by the control apparatus; and a processor configured to execute program instructions to:
process a packet based on the first processing rule;
transmit a first control message to the control apparatus;
when the second processing rule is set by the control apparatus, process the packet based on the second processing rule; and
when the packet matches neither the first nor the second processing rule, transmit to the control apparatus a second control message requesting setting of a third processing rule and an instruction to forward the packet;

wherein the control apparatus is configured to:
upon receiving the first and second control messages, create the second and third processing rules respectively,
set the second and third processing rules in the communication apparatus, and
discard packets included in the first and second control messages respectively.

7. A communication system comprising:
a control apparatus; and
a communication apparatus comprising:
a memory configured to store a first processing rule for unknown packets set in advance, and a second processing rule set by the control apparatus; and
a processor configured to execute program instructions to:
process a packet based on the first processing rule:
transmit a first control message to the control apparatus;
when the second processing rule is set by the control apparatus, process the packet based on the second processing rule; and
when the packet matches neither the first nor the second processing rule, transmit to the control apparatus a second control message requesting setting of a third processing rule and an instruction to forward the packet;

wherein the control apparatus is connected to the communication apparatus and configured to:
upon receiving the first and second control messages, create the second and third processing rules respectively,
set the second and third rules in the communication apparatus, and
discard packets included in the first and second control messages respectively.

8. A communication method performed by a communication apparatus the method comprising:
processing a packet based on a first processing rule;
transmitting a first control message to a control apparatus;
when a second processing rule is set by the control apparatus, processing the packet based on the second processing rule; and
when the packet matches neither the first nor the second processing rule, transmit to the control apparatus a second control message requesting setting of a third processing rule and an instruction to forward the packet.

9. A control method performed by a control apparatus connected to a communication apparatus, the control method comprising:

upon receiving a first and a second control messages from the communication apparatus, creating a second and a third processing rules respectively,
setting the second and third processing rules in the communication apparatus, and
discarding packets included in the first and second control messages respectively, wherein the communication apparatus is configured to:
process a packet based on a first processing rule;
transmit the first control message to the control apparatus;
when the second processing rule is set by the control apparatus, process the packet based on the second processing rule; and
when the packet matches neither the first nor the second processing rule, transmit to the control apparatus the second control message requesting setting of the third processing rule and an instruction to forward the packet.

10. A switch apparatus, comprising:
a memory configured to store a first flow entry and a second flow entry, the first flow entry including a first matching rule and a first action to process a packet, the second flow entry including a second matching rule and a second action to process a packet; and
a processor configured to execute program instructions to:
receive a packet;
compare the received packet with the first matching rule;
when the received packet does not match the first matching rule, compare the received packet with the second matching rule;
when the received packet matches the second matching rule:
send a request to process the received packet to a control apparatus, and
process the received packet based on the second action; and
receive, from the control apparatus, a third flow entry corresponding to the request, wherein the third flow entry includes a third matching rule and a third action to process a packet.

11. The switch apparatus according to claim 10, wherein the processor is further configured to execute the program instructions to process the received packet based on the first action when the received packet matches the first matching rule.

12. The switch apparatus according to claim 10, wherein each of the entries includes a priority to compare the received packet.

13. The switch apparatus according to claim 10, wherein the request includes a message to inform, to the controller, that the received packet has been processed.

14. The switch apparatus according to claim 10, wherein the processor is further configured to execute the program instructions to perform a flooding process when the received packet matches the second matching rule.

15. A communication system, comprising:
a switch apparatus; and
a control apparatus configured to control the switch apparatus,
wherein the switch apparatus comprises:
a memory configured to store a first flow entry and a second flow entry, the first flow entry including a first matching rule and a first action to process a packet, the second flow entry including a second matching rule and a second action to process a packet; and a processor configured to execute program instructions to:
receive a packet;
compare the received packet with the first matching rule;
when the received packet does not match the first matching rule, compare the received packet with the second matching rule;
when the received packet matches the second matching rule: (1) send a request to process the received packet to the control apparatus, and (2) process the received packet based on the second action; and
receive, from the control apparatus, a third flow entry corresponding to the request, wherein the third flow entry includes a third matching rule and a third action to process a packet.

16. The communication system according to claim 15, wherein the processor is further configured to execute program instructions to process the received packet based on the first action when the received packet matches the first matching rule.

17. The communication system according to claim 15, wherein each of the entries includes a priority to compare the received packet.

18. The communication system according to claim 15, wherein the request includes a message to inform, to the controller, that the received packet has been processed.

19. The communication system according to claim 15, wherein the processor is further configured to execute program instructions to perform a flooding process when the received packet matches the second matching rule.

20. A communication method, comprising:
receiving a packet;
comparing the received packet with a first matching rule;
when the received packet matches the first matching rule, processing the received packet based on a first action corresponding to the first matching rule;
when the received packet does not match the first matching rule, comparing the received packet with a second matching rule;
when the received packet matches the second matching rule:
sending a request to process the received packet to a control apparatus, and
processing the received packet based on a second action corresponding to the second matching rule; and
receiving, from the control apparatus, a flow entry corresponding to the request, wherein the flow entry includes a third matching rule and a third action to process a packet.

21. The communication method according to claim 20, wherein each of the matching rules includes a priority to compare the received packet.

22. The communication method according to claim 20, wherein the request includes a message to inform, to the controller, that the received packet has been processed.

23. The communication method according to claim 20, further comprising performing a flooding process when the received packet matches the second matching rule.

* * * * *